Oct. 25, 1932.                F. W. FUNKE                1,884,990
                           FIRE FIGHTING TOOL
                          Filed May 19, 1931
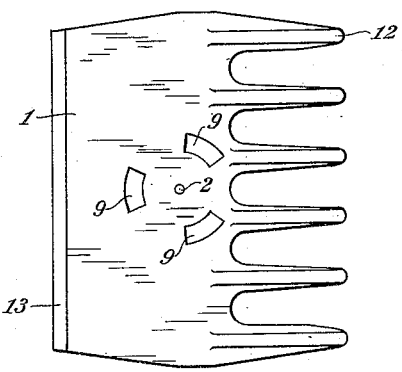
Fig. 1
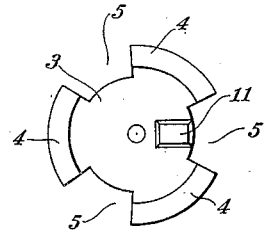
Fig. 3
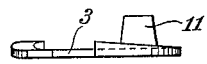
Fig. 3a
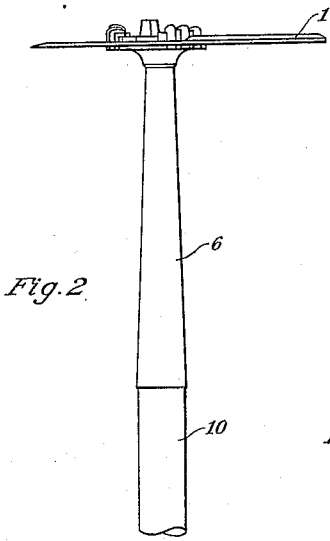
Fig. 2
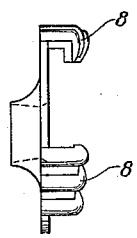
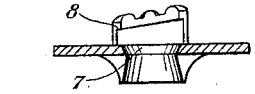
Fig. 4b
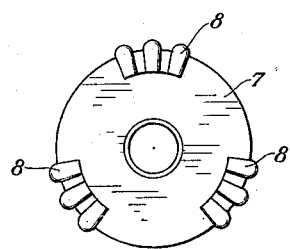
Fig. 4a   Fig. 4
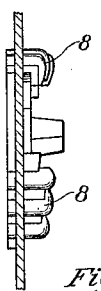
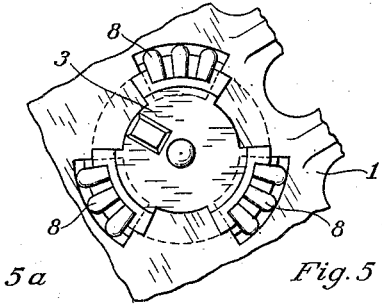
Fig. 5a    Fig. 5
Witnesses
Frank E. Wooldridge
Lester E. Jordan
Inventor
Fred W. Funke Patented Oct. 25, 1932

1,884,990

UNITED STATES PATENT OFFICE

FRED W. FUNKE, OF OAKLAND, CALIFORNIA; DEDICATED TO THE GOVERNMENT AND THE PEOPLE OF THE UNITED STATES OF AMERICA

FIRE-FIGHTING TOOL

Application filed May 19, 1931. Serial No. 538,490.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public to take effect upon the granting of a patent to me.

This invention relates to improvements in fire-fighting tools and has for its object an implement in the form of a combination hoe, rake and mattock readily detachable or demountable from the handle to facilitate packing for transportation and to produce an implement the parts of which may be replaced as they become worn. The tool comprises the features of the hoe and rake in one implement as well as embodying to a considerable degree the cutting features of the mattock. This latter feature necessarily follows from the weight of the tool head and blade, permitting an impact sufficient to cut light to medium size brush and roots. The design of the rake tines or teeth, as shown by the attached drawing, provides as near a non-clogging rake as it is possible to build. Rakes and hoes have been valuable tools for fire suppression work for many years. This implement combines the valuable features of both these tools in a manner extremely helpful in fire-fighting work.

In the accompanying drawing Figure 1 is a top plan view of the blade of the implement; Figure 2 is a side elevation of the assembled tool; Figure 3 is a top plan view of the lock plate; Figure 3a is a detailed sectional view of the lock plate; Figure 4 is a top plan view of the ferrule plate; Figure 4a is a side elevation of the ferrule plate; Figure 4b is a detailed sectional view of the ferrule plate showing lugs; Figure 5 is a top plan view of the combination of blade, lock plate and ferrule plate and Figure 5a is a side elevation of the combination of the blade, lock plate and ferrule plate.

Similar numerals refer to similar parts throughout the several views.

In carrying out the invention I provide a single piece blade having a hoe edge on one face and rake tines or teeth on the opposite face substantially as disclosed in Figure 1. Through a hole 2 in blade 1 is riveted the lock plate 3 on an easy or loose fit permitting the lock plate to turn freely on the rivet. The lock plate has three wedge blocks 4 turned on its periphery 120 degrees apart increasing from one-eighth inch to one-quarter inch in thickness through an arc of 72½ degrees. Recessed sections 5 of seven-sixteenth inch depth and 47½ degrees arc are left equidistant on the periphery between the wedge blocks.

The ferrule handle socket 6 is welded into the ferrule plate 7 forming one unit. Turned up on the periphery of the ferrule plate are three lugs 8 indicated in the vertical profile of the drawing Figure 4b. The outer edge of the lugs are ribbed for reinforcement; the under face of the lip of the lug is a tapering surface from one-fourth inch increasing to three-eighths inch, maintaining an opposing face to that on the wedge blocks 4 of the lock plate 3, which is identical. This increase in taper of the lip of the ferrule plate lug is confined to 45 degrees of arc for each of the three lugs. The lips or bearing faces of the lugs overhand the opposing faces on the wedge blocks of the lock plate 3 when in position, one-fourth inch on each wedge block providing a one-fourth inch bearing surface width.

The ferrule plate 7, to which is permanently attached the ferrule handle socket 6 is placed in position on the side of the blade opposite to that occupied by the lock plate 3, the lock plate 3 is rotated until the recessed sections 5 of the lock plate 3 are in line with the openings 9 in the blade 1. The lugs 8 of the ferrule plate 7 are inserted in the openings 9 in the blade 1 and the lock plate 3 is turned to the right until it binds on the opposing wedge faces on the lips of the lugs 8 on the ferrule plate 7. By means of a stone or other hard agent the lug 11 on the face of the lock plate 3 or the shoulders of the wedge blocks are hammered and the lock plate driven solidly into position firmly clamping the blade between the lock plate and the ferrule plate. The easy taper of the wedge faces hold the blade solidly in position and it will not become loose until the lock plate has been sharply struck a number of times to loosen the springing effect which is induced when the wedge blocks tighten against the lugs. Any suitable additional handle 10 may be inserted in the ferrule handle socket 6.

The novel means for attaching the blade of the implement to the handle is very efficient in operation, rigid and strong and permits parts replacement with ease and at a moderate cost. The ferrule plate and socket which form one unit may be replaced as may the lock plate, handle and blade. By making necessary replacements as parts are worn out, the tool becomes a permanent one in the field. The implement is quickly disassembled or taken apart.

It is apparent that slight changes may be made in the construction of the device without departing from the spirit of the invention. The shape of the blade as disclosed in the attached drawing of the device may, of course, be altered to render the implement adaptable to uses other than those of fighting fires. For fire-fighting a blade having stoutly constructed teeth or tines 12 and a beveled cutting edge 13 has been found to be most effective.

Having fully disclosed my discovery, I claim as my invention:

1. In a combined hoe and rake, a blade, provided with openings, a lock plate having wedge blocks and recessed sections loosely riveted to said blade, a ferrule plate, equipped with lugs so fashioned as to engage with said openings in said blade and to tightly connect the blade to the ferrule plate upon adjustment of the lock plate about its rivet, the wedge blocks engaging the undersides of the said lugs and a ferrule handle socket welded to and formed integral with said ferrule plate, which ferrule handle socket is fashioned to receive an additional suitable handle.

2. A tool having a ferrule handle socket fashioned to receive an additional suitable handle, a ferrule plate welded to and formed integral with said ferrule handle socket and having lugs so fashioned as to enter spaced openings in a blade, a blade provided with such openings, a lock plate, loosely riveted to said blade, and having spaced wedge blocks separated by recessed sections and so made as to engage rigidly with the lugs of said ferrule plate, the ferrule plate and lock plate being positioned on opposite faces of said blade, the lock plate being equipped with a lug to facilitate operation.

FRED W. FUNKE.